United States Patent [19]

Carter

[11] Patent Number: 4,585,378
[45] Date of Patent: Apr. 29, 1986

[54] DIVIDING HEAD WITH CAM AND THREAD CUTTING FACILITY

[76] Inventor: Keegan Carter, 2805 Darwin, Kilgore, Tex. 75662

[21] Appl. No.: 655,735

[22] Filed: Sep. 28, 1984

[51] Int. Cl.[4] ............................................. B23C 3/28
[52] U.S. Cl. ...................................... 409/67; 409/76
[58] Field of Search ..................... 409/76, 67, 68, 71, 409/69, 221, 222, 223; 82/5.5; 279/5; 51/216 T, 216 ND, 216 H, 216 R, 216 PC, 219 PC; 74/826

[56] References Cited

U.S. PATENT DOCUMENTS

| | | | |
|---|---|---|---|
| 230,825 | 8/1880 | Schuyler | 409/67 |
| 703,986 | 7/1902 | Brophy | 409/76 |
| 1,097,839 | 5/1914 | Best | 409/76 |
| 1,344,607 | 6/1920 | Samotej | 409/76 X |
| 1,407,485 | 2/1922 | Russen | 409/67 |
| 1,630,716 | 5/1927 | Pierce | 409/67 |
| 1,684,141 | 9/1928 | Perkins et al. | 409/222 X |
| 2,012,857 | 8/1935 | Volke | 409/222 X |
| 2,104,267 | 1/1938 | Melin | 409/76 |
| 2,356,097 | 8/1935 | Stanley | 409/222 |
| 2,386,146 | 10/1945 | Shaeffer | 409/67 |
| 2,409,299 | 10/1946 | Messana, Jr. | 409/67 |
| 2,677,169 | 5/1951 | Cybulski | 409/221 |
| 2,797,538 | 7/1957 | Studler | 51/219 PC |
| 2,923,206 | 2/1960 | Kovac | 51/216 ND X |
| 3,290,972 | 12/1966 | Daroci | 82/5.5 |
| 3,704,648 | 12/1972 | Burfoot | 409/76 |
| 4,034,646 | 7/1977 | Dahlin | 409/76 |
| 4,379,562 | 4/1983 | Corbacho | 409/221 X |

*Primary Examiner*—William R. Briggs
*Attorney, Agent, or Firm*—Harvey B. Jacobson

[57] ABSTRACT

A dividing head assembly comprises concentric outer and inner primary and secondary shafts journalled in a body member having a base for mounting the assembly on a machine tool bed in juxtaposition to a cutter. The inner shaft is coupled for rotation with the outer shaft and is axially slidably mounted in the outer shaft. The inner shaft has a workpiece holder at one end and a collar at the other end formed with a master thread and/or a master cam profile. A gear drive is provided for rotating the shafts, and the body member carries a follower for engaging the respective cam profile or master thread so that on rotation of the drive means the workpiece holder is provided with controlled rotation accompanied by axial movement thereof governed by the cam profile or master thread, for screw or cam forming a workpiece. A releasable coupling screw is operative between the shafts for locking the inner shaft against axial movement in the outer shaft so that with the follower disengaged from the cam profile or master thread, operation of the drive means provides rotation of the workpiece holder without axial movement thereof, for use of the device in the manner of a conventional dividing head.

10 Claims, 6 Drawing Figures

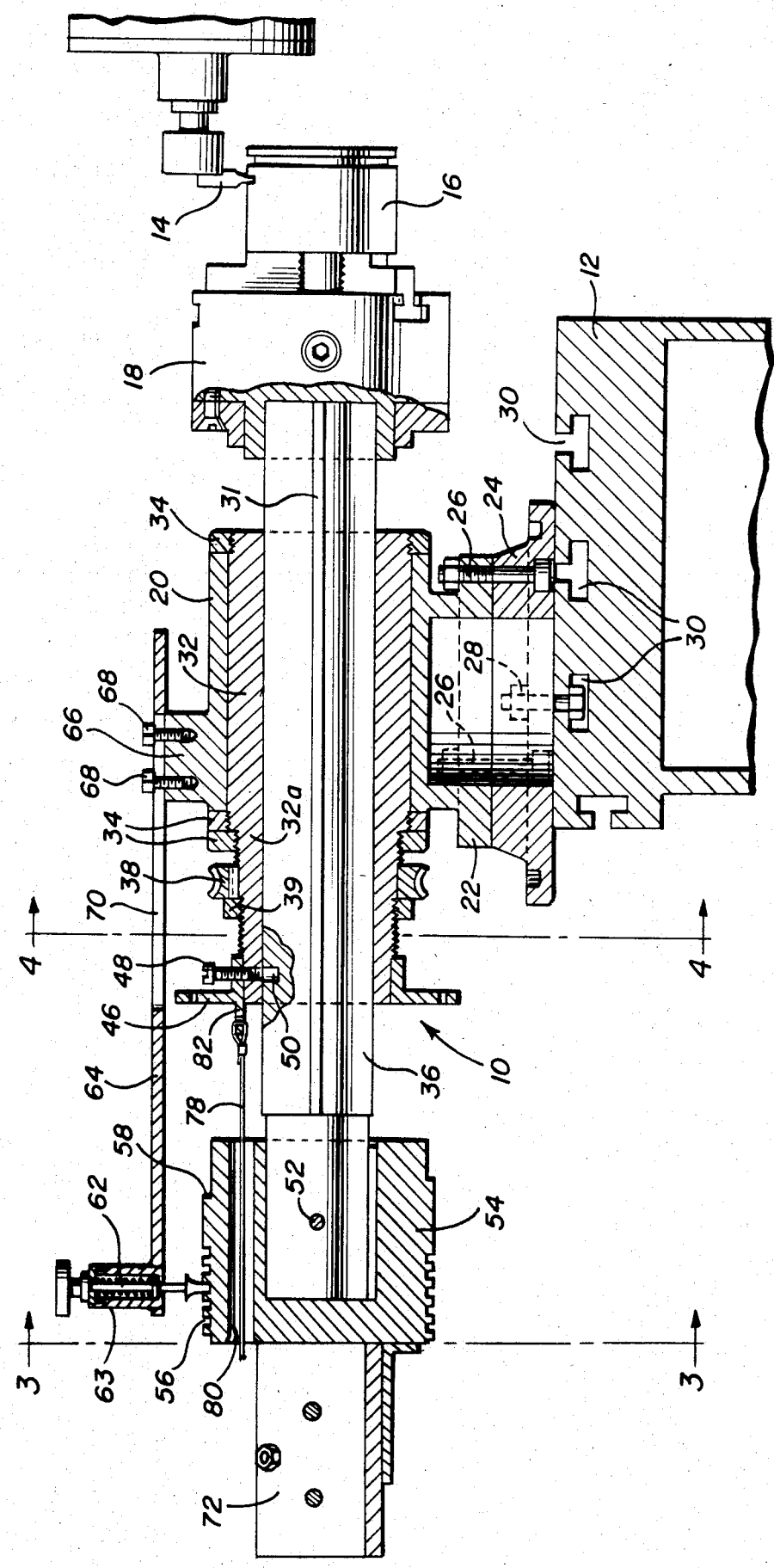

DIVIDING HEAD WITH CAM AND THREAD CUTTING FACILITY

BACKGROUND OF THE INVENTION

This invention relates to the field of machine tool equipment, more particularly to workpiece holder assemblies used in conjunction with milling cutters and the like.

It is a common requirement when machining a workpiece, for example when cutting a gear, for the workpiece, held in a chunk or like holder, to be rotatably indexed about its axis in controlled increments between successive milling operations. A dividing head is a form of indexing mechanism, commonly used for this purpose. Generally, however, known dividing heads have no facility for imparting controlled rotary and axial movement to a workpiece in a manner whereby the dividing head can also be used for screw threading a workpiece or for forming a cam profile thereon. The present invention provides a dividing head which has this facility.

STATEMENT OF PRIOR ART

Applicant is aware of the following U.S. patents, the relevance of which is indicated below:

U.S. Pat. No. 230,825, Aug. 3, 1880
U.S. Pat. No. 703,986, July 8, 1902
U.S. Pat. No. 1,097,839, May 26, 1914
U.S. Pat. No. 1,344,607, June 22, 1920
U.S. Pat. No. 1,630,716, May 21, 1927
U.S. Pat. No. 2,012,859, Aug. 27, 1935
U.S. Pat. No. 2,356,097, Aug. 15, 1944
U.S. Pat. No. 2,797,538, July 2, 1957
U.S. Pat. No. 3,290,972, Dec. 13, 1966

The patent to Stanley shows an indexing mechanism for use in cutting interrupted threads which includes a reciprocating drum with associated cam plate and index plate connected to a workpiece. When the indexing mechanism is engaged, the workpiece is rotated by one indexing step with each rotational movement of the drum in one direction. However, there is no facility for advancing the workpiece axially with respect to a cutting tool to effect threading. The patent to Vocke shows an indexing device for use with a dividing head to indicate revolutions and fractional revolutions of the head spindle. The patent to Schuyler shows a thread-cutting machine having a rotary cutting head which is moved axially by a gear drive to impart helical motion to the cutters, but which has no dividing head-type rotary indexing mechanism. The patent to Best shows a drill grooving machine in which a workpiece is advanced by a feed screw through a pair of drilling cutters. A similar machine is shown in the patent to Pierce. The patent to Samotej shows a guage finishing machine in which a threaded master gauge is used as a template for finishing threads on a gauge which is connected on the end of a shaft carrying the master gauge. The patent to Brophy shows a machine for cutting multiple worm threads on a workpiece, the machine including a graduated disc used as an indicator for moving the cutting tool a required amount relative to the workpiece for establishing the proper angle between the thread starts. The patent to Daroci shows a threading attachment for a lathe, the patent to Studler shows a device both rotating and actually reciprocating a tool to be ground in relation to a grinding wheel.

SUMMARY OF THE INVENTION

In accordance with the invention, there is provided a dividing head assembly having a cam and thread cutting facility comprising concentric outer and inner primary and secondary shafts journalled in a body member having a base for mounting the assembly on a machine tool bed and the like with the shaft axes horizontally disposed, the inner shaft being coupled for rotation with the outer shaft and being axially movable in the outer shaft, the inner shaft having a workpiece holder at one end and an attachment at its other end for a profiled means defining a master cam or master thread, drive means for rotating the shafts in unison, follower means for engagement with the profiled means for imposing a controlled axial movement on the inner shaft upon operation of the drive means, and releasable coupling means between the shafts for locking the inner shaft against axial movement in the outer shaft upon operation of the drive means and disengagement of the follower means from the profiled means. Thus, with the follower means engaged with the master cam or thread, and the shafts axially unlocked, the assembly can be used for thread or cam forming, and with the follower means disengaged and the shafts axially locked, the assembly can be used in the manner of a conventional dividing head.

The assembly may further be provided with a return spring device for imposing a forward axial thrust on the inner shaft. In one form of the invention, the drive means may comprise a ring gear on the outer shaft driven by a worm gear mounted on the body member.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is a sectional elevational view of the assembly shown in FIG. 1.

DESCRIPTION OF THE PREFERRED EMBODIMENT

Figure 1:
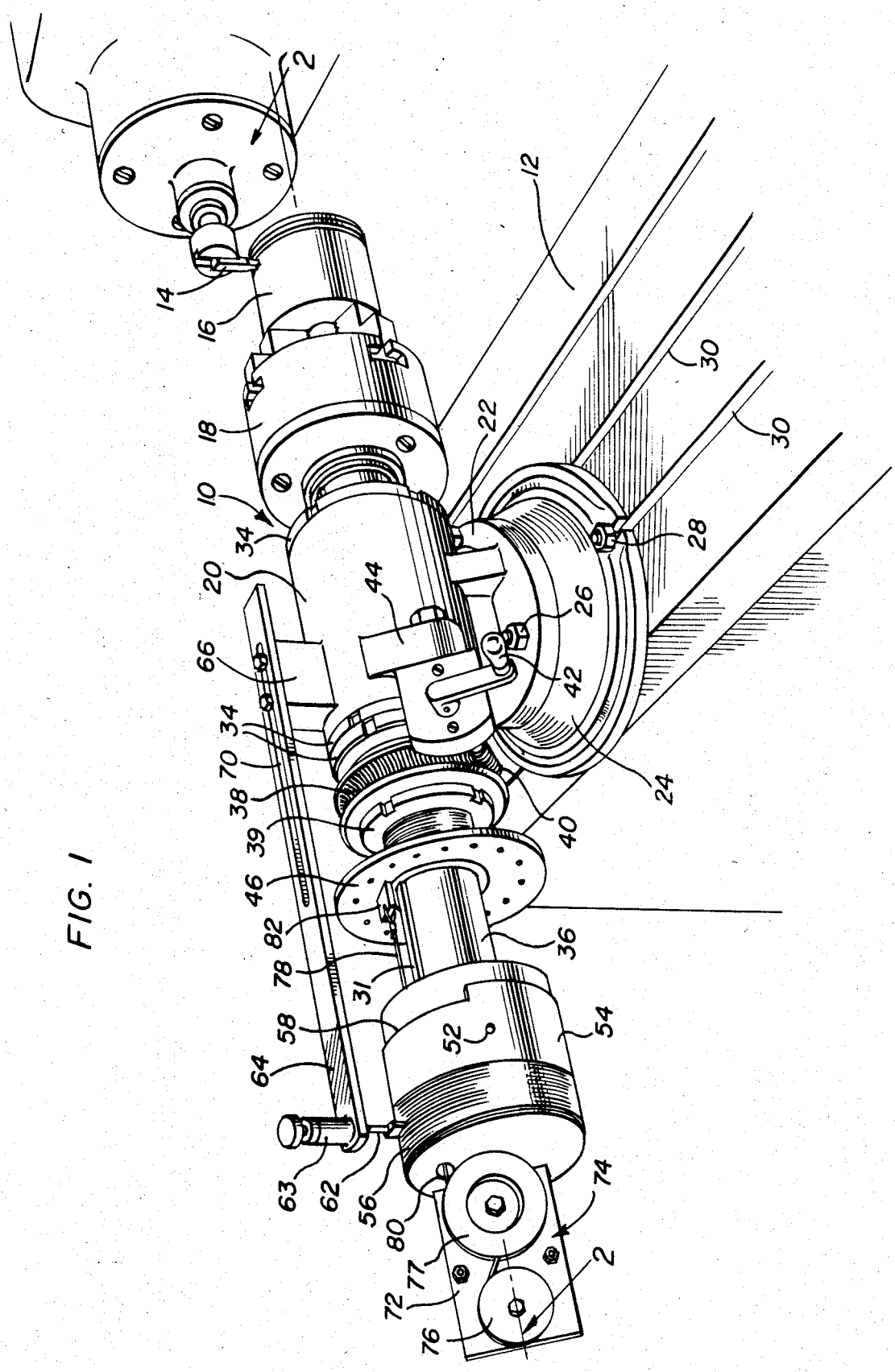
FIG. 1 is a perspective view of a dividing head assembly in accordance with the invention shown mounted on a milling machine.
Figure 4:
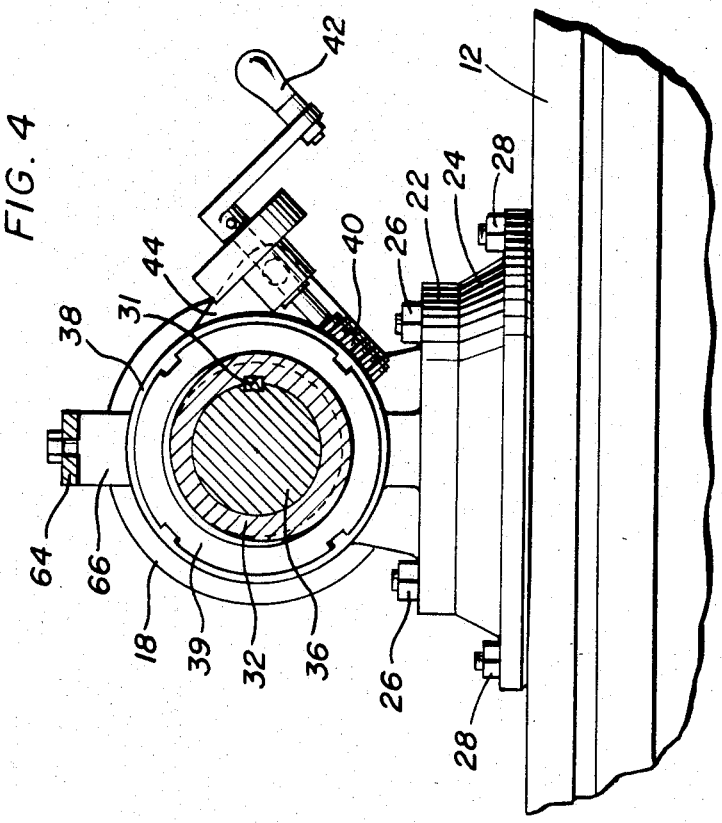
FIG. 4 is a sectional view on line 4—4 of FIG. 2.
Figure 6:
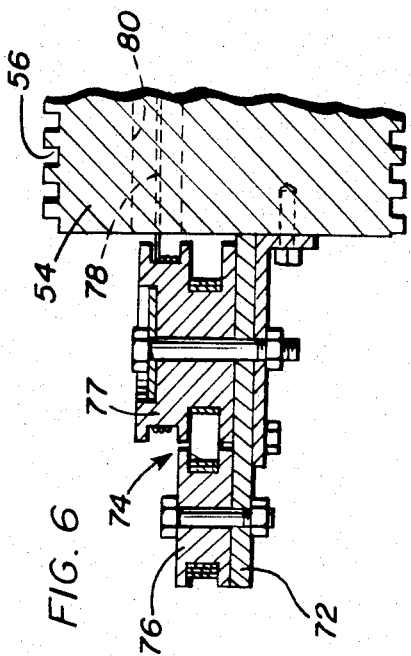
FIG. 6 is a sectional view on line 6—6 of FIG. 5.
Figure 3:
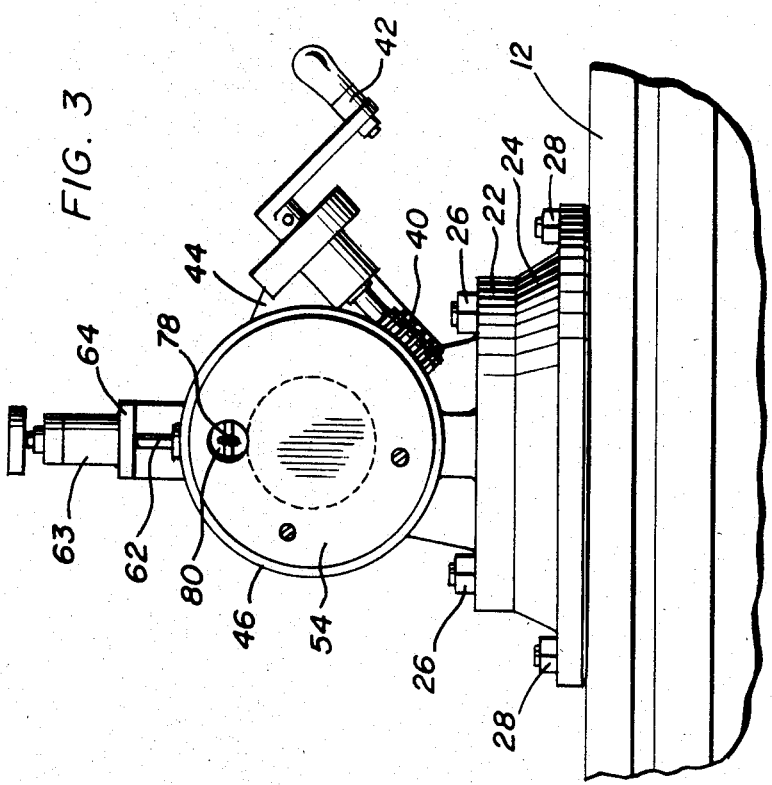
FIG. 3 is a sectional view on line 3—3 of FIG. 2.
Figure 5:
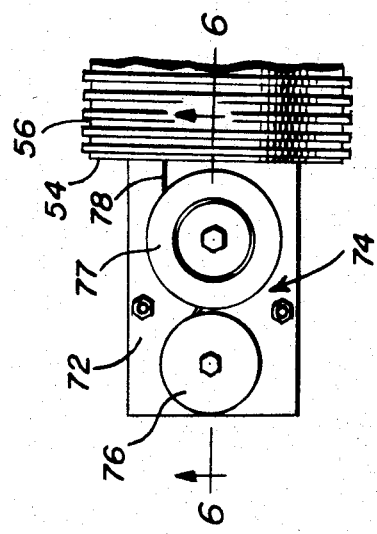
FIG. 5 is an elevational view of part of a return device at one end of the assembly.

As shown in FIGS. 1 and 2 of the drawings, a dividing head assembly 10 is mounted on the bed 12 of a milling machine or the like having a stationary cutter 14 used, in the illustrated embodiment, for cutting threads on a workpiece 16 held in a chuck 18 at a forward end of the assembly.

Assembly 10 includes a cylindrical body member 20 having a base 22 for mounting the body member on machine bed 12 through a base attachment 24 with the axis of the body member substantially horizontal. Bolt and nut assemblies 26 may fit through holes in base 22 and arcuate slots in attachment 24, allowing the rotational alignment of assembly 10 to be adjusted. The assembly may be secured to machine bed 12 in known manner by bolt and nut assemblies 28 fitting in guideways 30 in the machine bed.

As shown more particularly in FIG. 2, body member 20 has a hollow primary shaft 32 journally supported therein, the shaft being secured in position by threaded locking rings 34 allowing the shaft to rotate in the body member while preventing axially movement thereof, the locking rings also providing wear adjustment. Within the primary shaft is a secondary shaft 36 which is keyed to shaft 32 by an elongate key 31 fitting in complementary keyways in the respective shafts, so that shaft 36 is constrained to rotate with shaft 32, but is free to slide axially in shaft 32. Primary shaft 32 has a rearward portion 32a projecting from the rear of body member 20, and on which is keyed a ring gear 38 held in place by a locking ring 39. Ring gear 38 forms a wheel portion of a worm and wheel drive for rotating shafts 32 and 36 in the body member. In the illustrated embodiment, a worm 40 with a manual operating handle 42 meshes with gear 38, the worm being supported in a bracket 44 mounted on body member 20.

The illustrated worm and wheel drive constitutes a means for providing controlled rotational movement, such as indexing movements, to the shafts. In this respect, it is understood that the worm and wheel drive may be replaced by any other form of suitable drive mechanism, manual or mechanical, which is known for this purpose.

Also affixed, by any suitable means not shown, on the rearward end of shaft 32, is a flanged disc 46, with a coupling screw 48 extending through the flange thereof for threading into an out of a hole 50 formed in the secondary shaft 36. Screw 48 thus forms a coupling means for selectively locking shafts 32 and 36 together axially and preventing axial movement of shaft 36 in shaft 32.

On the rearward end of shaft 36 there is releasably secured, as by set screws 52 or the like, a collar 54 formed externally with a master thread 56 and/or with a master cam profile 58. In the illustrated embodiment, the collar is formed with both a master thread and with a master cam profile, however the collar can be provided with only either one of these suited to respective thread or cam cutting operations. A follower assembly is provided for cooperation with the respective master thread or master cam profile, such assembly comprising a sprung pin 62 constituting a follower, and being carried in a housing 63 at the end of a mounting arm 64 secured to a boss 66 on body member 20 by screws 68 extending through an elongate slot 70 in the arm. The slot and screw attachment allows the effective length of arm 64 to be adjusted so that follower pin 60 can be engaged either with the master thread or with the master cam profile.

On the rear of collar 54 is secured a bracket 72 carrying a conventional form of reel-type spring motor assembly 74 including spring reels 76, 77 and a band spring 78 which extends from the motor through a bore 80 in collar 54 and is attached to a bracket 82 on disc 46. The action of the spring motor is such as to axially urge shaft 36 forwardly in shaft 32 providing tension for maintaining the follower pin in the master thread or master cam profile.

Chuck 18 is secured to the forward end of shaft 36 by any conventional means.

When the assembly is to be used in the manner of a conventional dividing head, coupling screw 48 is threaded into hole 50, so that shafts 32 and 36 are locked together axially, preventing axial movement of shaft 36, and negating the thrust of the spring motor. Also, follower pin 60 should be removed from engagement with the master cam and thread profile. In this mode of operation, actuation of the worm and wheel drive, which may be by way of indexing movements, will produce equivalent rotational movements of chuck 18 with no axial movement thereof.

When the assembly is to be used for screw or cam forming, screw 48 is released, and pin 60 engaged with the respective master screw or cam profile or collar 54, so that actuation of the worm and wheel drive will impose a controlled rotary and axial motion on chuck 18, causing cutter 14 to duplicate the respective master profile on workpiece 60.

It will be appreciated that the invention provides a simple and effective mechanism for providing a workpiece holder selectively with controlled rotary motion per se, for use, for example, as a conventional dividing head, or with controlled rotary and axial motion for thread or cam forming purposes.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A dividing head assembly comprising concentric outer and inner primary and secondary shafts journalled in a body member having a base for mounting the assembly on a machine tool bed and the like, means coupling the inner shaft for rotation with the outer shaft and for axial sliding movement in the outer shaft, the inner shaft having means for attaching a workpiece holder at one end thereof, means for attaching profiled means to the inner shaft defining a master thread or a master cam, drive means for rotating the shafts, follower means for engaging the profiled means and imposing axial movement on the inner shaft controlled by the profiled means responsive to operation of the drive means whereby the workpiece holder may be provided with controlled axial movement accompanied by rotation thereof for screw or cam forming a workpiece, and releasable coupling means operative between the shafts for locking the inner shaft against axial movement in the outer shaft whereby upon disengagement of the follower means from the profiled means, operation of the drive means provides rotation of the workpiece holder without axial movement thereof.

2. The invention of claim 1 wherein the follower means comprises a follower pin carried by an arm mounted on the body member.

3. The invention of claim 1 wherein one end of the inner shaft extends from one end of the body member and the profiled means is at the other end of the inner shaft extending from the other end of the body member.

4. The invention of claim 1 further including spring means for urging the inner shaft axially in the direction of said one end.

5. The invention of claim 1 wherein the spring means comprises a band spring and reel-type spring motor carried on the other end of the inner shaft, with the band spring thereof being extended from the motor and connected to means associated with one of the body member and the outer shaft.

6. The invention of claim 5 wherein the spring motor is mounted on the profiled means and the band spring extends through a bore formed lengthwise through the profiled means.

7. The invention of claim 5 wherein the means associated with one of the body member and the outer shaft comprises a disc on the outer shaft.

8. The invention of claim 1 wherein the coupling means comprises a screw radially threaded into the outer shaft for threading into and out of a hole in the inner shaft.

9. The invention of claim 1 wherein the drive means comprises a ring gear on the outer shaft meshing with a drive gear mounted on the body member.

10. The invention of claim 9 wherein the drive gear is associated with a manual operating handle.

* * * * *